Figure 1:
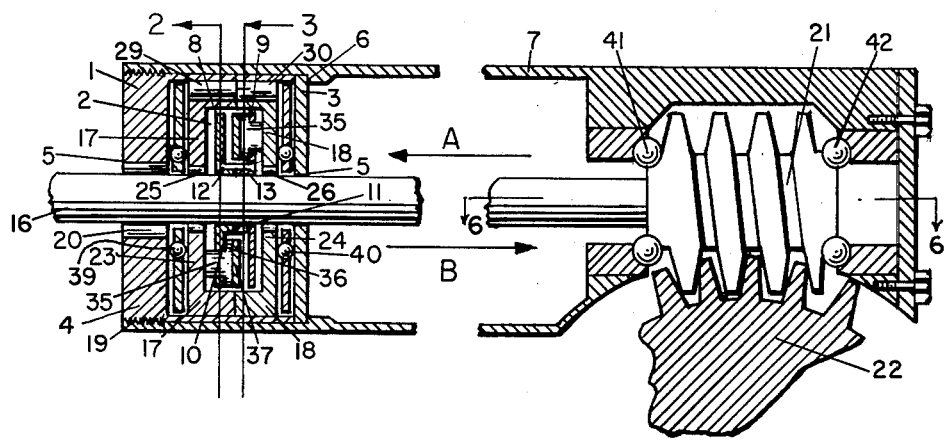

Jan. 23, 1962  V. KINSER  3,017,975
AUTOMATIC SHAFT BRAKE MECHANISM
Filed June 18, 1958

INVENTOR.
Vernon Kinser

United States Patent Office 3,017,975
Patented Jan. 23, 1962

3,017,975
AUTOMATIC SHAFT BRAKE MECHANISM
Vernon Kinser, 11025 Goethe, Detroit, Mich.
Filed June 18, 1958, Ser. No. 742,844
5 Claims. (Cl. 192—8)

This invention relates generally to friction braking devices and has more particular reference to an automatic shaft brake device.

By an automatic shaft brake, I have specific reference to a braking means, disposed for actuation by controlling and controlled members, as driving and driven gears or the like, so that movement or actuation of the controlling member is to some extent necessary to permit and concurrently effect or permit motivation of the controlled member.

More specifically, my invention relates to a shaft brake employing frictional restraint to effect its purpose, as, in contrast to a worm and gear, in some of its several well known forms, as heretofore employed, for example, in elevator hoists and automotive steering gears, may be called an irreversible or self-locking gear, as embodied in a worm gear constructed in such a manner that manipulation or semi-manipulation of the worm is necessary to permit rotation of its mating gear wheel, the lock or braking being effected by the friction between the teeth of the gear wheel and the worm, which normally serves to hold the gear wheel against rotation.

Obviously, however, whenever the gear-wheel is carrying a load; the friction between the worm and the wheel is increased proportionately, and hence, in order to release the worm, as may be said, from its frictional restraint in order to move the wheel, it is requisite to apply sufficient force to overcome the friction between the worm and the wheel, and then to add to that force the effort required to effect the desired motivation of the load carried by the wheel, and this condition obtains, with consequent loss of energy required to release the worm from the wheel, whether, as in a hoist, the load is being raised or lowered or whether, as in an automotive steering-gear, the car is being turned, or straightened from a turn, and the like.

My present invention has hence for its prime object the provision of means of the kind described wherein the controlled member may be restrained against motion which would tend to occur independently of actuation of the controlling member, motivation of the controlled member being wholly under the control of the controlling member, the controlled motion of the controlled member being effected, however, responsively to actuation of the controlling member in the desired direction, with merely a minimum holding or driving torque, that is to say, a substantially less effort than would be required to drive a worm from its frictional lock with its gear-wheel.

Another object of the invention is the provision of means whereby to effectively regulate the controlling effects of the controlling member of the mechanism combination to conform to specific needs.

And with the above and other objects in view, my invention resides in the novel features of form, construction, arrangement, and combination of parts presently described and pointed out in the claims.

In the accompanying drawings (one sheet)—

Figure 2:
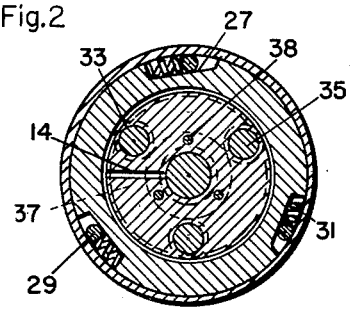
Figure 3:
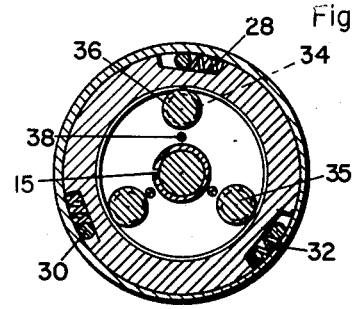
Figure 4:
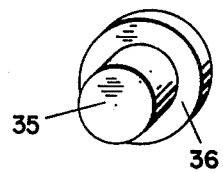
Figure 5:
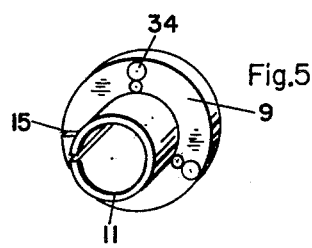
Figure 6:
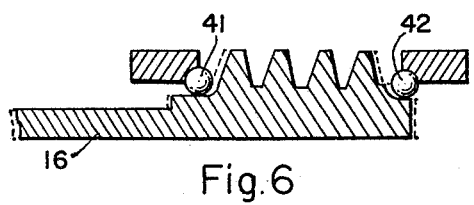

FIGURE 1 is a longitudinal sectional view through an automatic shaft brake of my invention, showing some other parts in fragmentary and broken sectional views;

FIGURES 2 and 3 are transverse sectional views of the mechanism, taken respectively on the lines 2 and 3 on FIGURE 1;

FIGURES 4 and 5 are enlarged views of one of the contact-members 35 and of one of the carrier-members 9, respectively;

FIGURE 6 is an enlarged detail view depicting the clearance provision for the steering worm which permits axial displacement of the steering shaft.

The mechanism which may more conveniently in many instances include conventional parts of some vehicle or machine may very readily be illustrated by a typical automotive installation. With this application in mind, and referring now more in detail and by reference characters to the drawings, which represent practical embodiments of my invention, the main frame of the controlled part of the mechanism compromises a stationary restraining member or housing 1, whose interior provides a chamber 2, the housing 1 being composed of the end plate or washer 3, and the housing member 4. The washer 3 and the housing member 4 are equipped with respective central axially aligned bores 5 coincident with respect to each other and are rigidly secured together in any suitable manner, as, in this case, the housing member 4 is provided with the threads 19 for cooperation with a suitably adapted pocket 6 provided in the jacket-tube 7 of the vehicle whereby to rigidly secure the housing member 4 and the end plate 3 against movement in any direction. Best seen in FIGURE 1.

Disposed in the chamber 2 is a pair of carrier-washers 8, 9. The carrier-washers 8, 9 are spaced with respect to each other by means of properly faced flanges 10, 11 which are included by the carrier-washers 8, 9, respectively. Referring to FIGURES 2, 3 and 5 it will be noticed that the carrier-washers 8, 9 are slitted in any suitable manner, as at 14, 15 respectively so as to facilitate cooperation of the bores 12, 13, which are formed by the flanges 10, 11, respectively, with the controlling member or steering-shaft 16 of the vehicle whereby to effectively connect the carrier-washers 8, 9 to the steering-shaft 16.

As will be understood, such parts as jacket-tube 7 and the steering-shaft 16 are usual in the manufacture of all automobiles. It is the usual practice that a stationary jacket-tube 7 be provided for support of the steering-shaft 16, though, in this case, the steering-shaft 16 is journaled in a bearing 20 mounted in the bore 5 of the housing member 4 for support by the jacket-tube 7. It may be well to here say that it is usual, likewise, for the steering-shaft 16 to be connected to a worm 21 supported, as, by the bearings 41, 42, the worm normally should mesh with a gear 22 (fragment shown) for, in turn, actuation of the steering linkage of the vehicle (not shown) by the steering-shaft 16. The steering-shaft spans the distance from the worm 21 to the bearing 20 and extends further for support of a steering wheel (not shown).

In actual operation of a vehicle, alternate turning of the steering shaft 16 for maneuvering of the vehicle will result in a consequent alternating of the thrust of worm 21 for axial movement of the steering-shaft 16, however slight, in the direction of the arrow A or B, as the case may be. It may be well to here point out that means are provided for response to such axial movements of the steering-shaft 16 for restraining the steering-shaft 16 against rotation-wise movement, under conditions and circumstances to appear later, for steering response of the vehicle.

Embracing the outer periphery of the carrier-washers 8, 9 is a pair of rotatable members or rings 17, 18. The rings 17, 18 are provided respectively with the flanges 23, 24 which extend inwardly for axial disposition with respect to the carrier-washers 8, 9 for purposes to appear later. As best seen in FIGURE 1, the rings 17, 18 are journaled on the steering-shaft 16 by means of the respective bearings 25, 26 which are provided in the respective flanges 23, 24.

The rings 17, 18 are journaled against thrust by the respective bearings 39, 40 for purposes to appear later and are each provided with a circumferentially spaced series of tangential pockets 27, 28, respectively, and preferably three in number, the tangential axes of the several pockets 27 in the ring 17 being oppositely disposed to the tangential axes of the pockets 28 in the ring 18, as best seen in FIGURES 2 and 3 respectively.

In each of the pockets 27 is mounted a roller 29 suitably seated on a spring 31 disposed between the end wall of the pocket 27 and the roller 29 for normally urging the latter outwardly of the pocket 27 for wedging each roller 29 between the inner wall of the pocket 27 and the inside wall of the housing member 4, the pockets 28 being similarly equipped with the rollers 30 and the springs 32 for cooperation with the housing member 4, the mechanism cooperating with the ring 17 or 18 and the housing member 4, as the case may be, forming, as may be said, a pair of one-way ratchets or over-running clutches operable in opposite directions.

Circumferentially spaced in the carrier washers 8, 9 is a respective series of holes 33, 34 and preferably there are three in each series. Slidably mounted in each of the holes 33, 34 is a contact-member 35, being adapted on one end for frictional cooperation with the flange 23 or 24, as the case may be, and being provided on the other end with a flange 36 for impingement with the carrier-washer 8 or 9 for purposes now appearing.

Because of the more extensive use of power-steering on present day vehicles, the real need for mechanism of the kind described is to actuate the power-steering unit and to assist in control at high speeds where it is dangerous for the power-steering unit to operate. Accordingly, in order to meet with these needs without expensive duplication means are provided for pressure-wise regulation of thrust from the steering-shaft 16 to the contact members 35.

For which purpose, referring now more especially to FIGURES 2 and 3, it will be noticed that the several contact members 35 carried by the carrier-washer 8 are circumferentially spaced intermediately with respect to the several contact-members 35 carried by the carrier-washer 9, yieldable means is provided in the form of a spring-washer 37 for association with the flanged end of the several contact-members 35 for axial support thereof, and the carrier-washers 8, 9 are rigidly secured together by means of the three or any suitable number of rivets 38 whereby to effectively bind the spring-washer 37 with the several contact-members 35 for tension of the spring washer 37 and for impingement of the flanges 36 with the carrier-washer 8 or 9 as the case may be. The spring-washer 37, it will be understood, being, thus, introduced into the linkage through which the worm 21 must transmit movement to the contact members 35 in such a manner as to effectively regulate the amount of axial thrust that may be transmitted therebetween.

As will be understood, in steering an automobile certain vibration forces occur responsive to road shock, the wind, and shifting of the weight of the car, which normally tend to impede the steering of the automobile. Such vibration forces are resisted by the mechanism in cooperation with, and controlled by, the steering wheel, which acts in the following manner:

In such use, referring to FIGURE 1, let it be supposed, for example, that such vibration forces tend to rotate the steering shaft 16 counterclockwise, FIGURE 2, against a controlling or, as may be said, a counteracting force upon the steering shaft 16, whereupon, the steering shaft 16 will be thrust, on this instance, in the direction of the arrow A, FIGURE 1, the spring 37 will actuate the contact-members 35 carried by the carrier-washer 8 for frictional cooperation with the flange 23 whereby to effectively connect the steering-shaft 16 to the ring 17.

The counterclockwise rotary bias of the steering-shaft 16, thus transmitted to the ring 17, tends to roll the rollers 29 outwardly of the pockets 27 thereof for wedging each roller 29 between the walls of its pocket 27 and the housing 1, so that the rollers 29 are caused to effectively transmit such counterclockwise rotary bias of the steering shaft 16 from the ring 17 to the housing. The springs 31, it will be understood, normally effecting such wedging action, so that the ring 17 will have very little or substantially no movement. So that, under the influence of the contact-members 35, actuated in accordance to the spring-washer 37, the steering-shaft 16 is effectively restrained against rotation in its biased direction.

Against such counterclockwise rotary bias of the steering-shaft 16, however, the contact members 35 carried by the carrier-washer 9 have no restraining effect, yet, on reversal of the vibrational forces set up in the vehicle, the steering-shaft 16 is biased for clockwise movement, whereupon, the thrust of the steering-shaft 16 will be in the direction of the arrow B, the contact-members 35 carried by the carrier-washer 9 will become engaged with the ring 18, the rollers 30 will be wedged between the pockets 28 and the housing 1, and the steering-shaft 16 will again be prevented from taking further rotational movement, substantially in the manner previously set forth.

It will be seen, however, again for example, that if such vibration forces tend to rotate the steering-shaft 16 counterclockwise against a controlling or conteracting rotative bias for restraining the steering-shaft 16 against rotation, as has been described, and then the controlling or clockwise rotative bias of the steering-shaft 16 is increased until the tendency of rotation of the steering-shaft 16 is clockwise. That the steering-shaft 16, due to this change in its rotative bias, will cause the ring 17 to tend to rotate in a clockwise direction, against which the rollers 29 have no restraining effect since they tend to roll inwardly in the pockets 27 thereof for releasing the ring 17, for, in, turn, effecting unrestrained torque-transmission by the steering-shaft 16.

Likewise, if the steering-shaft 16 is biased for counterclockwise movement, the ring 18 will tend to rotate counterclockwise the rollers 30 will roll inwardly in the pockets 28 for releasing the ring 18, and the steering-shaft 16 will again effect unrestrained torque-transmission.

Thus, it will be seen, the rings 17, 18 are rotatable in particular directions for unrestrained movement of the steering shaft 16 in any desired direction. The restraint of the device being, however, automatic and only to restrain the steering-shaft 16 against rotative bias contrary to desired steering control.

In use and operation, it will be seen that the mechanism effects its purpose. When applied in connection with the conventional type of steering-gear for use in automobiles, the steering-gear can be made highly efficient, and by use of the frictional restrainst of my automatic shaft brake, a high degree of irreversibility may be had, as the term is commonly applied, and yet have a high rate of steering efficiency, and, by use of the regulating effects of a flexible member such as the spring-washer 37 the thrust of a conventional steering gear may be adapted to effectively control the device. It will be obvious, therefore, that the device is highly adaptable and that less physical and mental effort is necessary in order to control an automobile equipped with the device.

It will be understood that, if desired, various changes and modifications in the form, construction, arrangement and combination of the several parts of the automatic shaft brake mechanism may be made and substituted for those herein shown and described without departing from the nature and principles of my invention.

Having thus described my invention, what I claim and desire to secure by Letters Patent is:

1. An automatic shaft brake mechanism comprising a driving shaft, a housing member having an inner wall and being disposed surroundingly of said shaft in radially outwardly spaced relationship thereto, a pair of annular friction members rotatably mounted on said shaft in spaced-apart relationship, a flexible thrust member the plane of which is in normal relationship to the axis of said shaft disposed intermediate said friction members, a pair of annular carrier members, one each of which is fixedly mounted on said shaft between a friction member and the flexible member, a plurality of coupling elements mounted on each carrier member, being disposed circumferentially thereof, for slidable movement longitudinally of said shaft, means for maintaining said carrier members in predetermined spaced relationship, detent means provided on the peripheral portion of each of said friction members for engagement with the inner wall of said housing, said detent means being adapted for opposed action, said coupling elements having enlarged portions at one end for engagement with the adjacent face of said flexible member, and said elements being adapted for engaging on their other ends the confronting portion of the adjacent friction member upon axial movement of said shaft and means provided outwardly of each friction member for enclosing the ends of said housing.

2. An automatic shaft brake mechanism comprising a driving shaft mounted for axial thrust upon rotation, a stationary member disposed surroundingly and radially outwardly, of said shaft and having a bearing, said shaft being journaled in the said bearing of said stationary member for rotatable support of said shaft, a pair of rotatable ring members freely mounted in spaced apart relationship upon said shaft, oppositely acting friction means carried by said ring members for engaging said stationary member upon rotation of the related ring member in a predetermined direction to effect braking action, a pair of annular carrier members fixedly mounted on said shaft between said ring members, at least one coupling element slideably supported on each carrier member for movement longitudinally of said shaft and projecting at its ends through the related carrier member whereby the outer ends thereof are presented for engaging the adjacent ring member, a resilient thrust member disposed between the pair of carrier members and being intimately engaged on its opposite sides to the inner ends of the coupling elements whereby upon axial thrust of said shaft through rotation of the latter said thrust member will cause the coupling elements on one of the sides of said thrust member to engage the related ring member for effecting rotation thereof so that is associated friction means will engage said stationary member upon rotation of said shaft in a predetermined direction.

3. An automatic shaft brake mechanism as described in claim 2 and further characterized by said friction means comprising cylindrical detent members located on the peripheral portion of each ring member.

4. In an automatic shaft brake mechanism, a controlling rotatable member adapted for axial thrust upon rotation, a pair of mounting members carried on said controlling member for rotation therewith, contact elements slideably supported on said mounting members in parallel axial relationship to said controlling member, a flexible thrust regulating member disposed with respect to said mounting members and being engaged on its opposite sides with the inner ends of the contact elements of the mounting members, a pair of freely rotatable friction members, one each of which is carried on said controlling member in spaced relationship to one of said mounting members for engagement by the outer ends of the proximate contact elements upon movement of said thrust regulating member, oppositely acting detent members mounted on the peripheral portion of said friction members, a stationary member mounted radially outwardly of said detent members for engagement therewith.

5. An automatic shaft brake mechanism comprising a driving shaft mounted for axial thrust upon rotation, a stationary member disposed surroundingly of said shaft and having a bearing, said shaft being journaled in the said bearing of said stationary member, a pair of rotatable ring members freely mounted in spaced apart relationship upon said shaft, oppositely acting friction means carried by said ring members for engaging said stationary member upon rotation of the related ring member in a predetermined direction, to effect braking action, a pair of annular carrier members fixedly mounted on said shaft between said ring members, a plurality of coupling elements slideably supported on each carrier member for movement longitudinally of said shaft and projecting at their ends through the related carrier member whereby the outer ends are presented for engaging the adjacent ring member for coupling the same to said shaft, a resilient thrust member disposed between the pair of carrier members and being intimately engaged on its opposite sides to the inner ends of the coupling elements whereby upon axial thrust of said shaft through rotation of the latter, said thrust member will cause the coupling element on one of its sides to engage the related ring member for effecting rotation thereof so that its associated friction means will engage such stationary member upon rotation of said shaft in a predetermined direction, said carrier members being interconnected for engaging said thrust member to the coupling elements.

References Cited in the file of this patent

UNITED STATES PATENTS

| | | |
|---|---|---|
| 1,829,825 | Freeman et al. | Nov. 3, 1931 |
| 1,870,532 | Schuetz | Aug. 9, 1932 |
| 2,006,261 | Catella | July 25, 1935 |
| 2,424,912 | Briggs et al. | July 29, 1947 |
| 2,427,120 | Blair | Sept. 9, 1947 |
| 2,653,691 | Weiland | Sept. 29, 1953 |
| 2,766,851 | Driehaus | Oct. 16, 1956 |

FOREIGN PATENTS

| | | |
|---|---|---|
| 563,489 | Great Britain | Aug. 16, 1944 |